3,118,845
NOVEL SILICA-ALUMINA CRACKING CATALYST
William B. Innes and Malden W. Michael, Stamford, Conn., assignors to American Cyanamid Company, New York, N.Y., a corporation of Maine
No Drawing. Filed June 22, 1960, Ser. No. 37,841
8 Claims. (Cl. 252—453)

This invention relates to a process for the preparation of low cost microspheroidal fluid cracking catalysts and more particularly to the preparation of a low cost, high quality microspheroidal silica-alumina cracking catalyst and to the catalysts so produced. Further, this invention relates to the process of catalytically cracking petroleum hydrocarbons employing such catalyst.

We have heretofore attempted to incorporate dry materials into cracking catalysts with the principal object in mind of lessening production costs and preventing overheating during regeneration, without seriously detracting from other important properties of the cracking catalyst. However, the simple mixing of dry materials with hydrogels prior to drying results in a product with excessive fines and poor attrition properties, due to uneven shrinkage during drying. Additionally, such mixtures may tend to classify.

It is an object of the present invention to provide a commercially acceptable fluid microspheroidal silica-alumina cracking catalyst containing substantial portions of a low cost additive material.

It is a further object to provide such a cracking catalyst having good particle size distribution, substantially uniform particle shape and one in which the additive material is in intimate association with the catalytic material, whereby heat dissipation during carbon burning is improved with resulting increase in catalyst life and whereby a catalyst of good attrition resistance results.

It is a further object of this invention to provide such a silica-alumina cracking catalyst in which the catalyst and additive components do not tend to classify.

It is a still further object of this invention to provide a suitable microspheroidal silica-alumina cracking catalyst at substantially lower manufacturing cost than heretofore experienced, making it possible to use more catalyst and thereby reduce metals contamination and thus improve selectivity.

Another object of the present invention is to provide a catalyst which is not affected by a given level of metals contamination to the extent of present commercial catalysts.

These and other objects and advantages of this invention will become apparent from the detailed description set forth hereinbelow.

In accordance with the present invention we have found that if a high alumina silica-alumina hydrogel and a finely divided inorganic additive material are intimately associated so that the intimately associated composition as fed to a spray drier is characterized by the weight ratio between "hydrogel fines" and additive material is at least .8, and the additive content is at least 10% based on the total weight of the final catalyst, a catalyst having excellent properties is produced.

By "hydrogel fines" as this term is used herein, it is meant silica-alumina hydrogel particles finer than 44 microns (325 mesh).

By the term "finely divided" as employed in conjunction with additive material herein it is meant materials at least 95% by weight of which are finer than 44 microns and at least a major portion (more than 50%) is finer than about 10 microns and preferably finer than 5 microns.

By "intimate association" as this term is used herein, it is meant that in the final product the additive particles are in direct contact with and enclosed by silica-alumina gel, as evidenced by microscopic examination. "Intimate association" may be accomplished by various suitable means, such as grinding, milling, as with a Fitz mill, preferably by homogenizing and the like, or by employing combinations of these means.

By "high alumina" silica-alumina hydrogel, as that term is employed herein, it is meant silica-alumina hydrogels containing from between about 20 and 30% of alumina, based on the dry weight of the hydrogel.

By "ignited solids basis" it is meant solids content after ignition at 1000° C.

These high alumina, silica-alumina hydrogels may be prepared in accordance with any of a number of acceptable procedures. According to one such method, hydrated silica may be precipitated from a dilute solution of an alkali metal silicate such as commercial water glass by acidification with a mineral acid, for example, sulfuric acid. The precipitatted, hydrated silica may then be suspended in an aqueous solution containing an aluminum salt such as aluminum sulfate or aluminum nitrate, and hydrated alumina may then be precipitated on the hydrated silica by the addition of a basic compound such as ammonia, whereby a silica-alumina slurry is formed. Details of this general procedure are described in U.S. Patent No. 2,701,793, issued February 8, 1955.

Another suitable method for preparing the silica-alumina hydrogel containing high alumina content is described in copending application, Serial No. 498,798, filed April 4, 1955, now abandoned. In accordance with the method described therein, it has been found that by properly controlling the chemical reaction between an alkali metal aluminate and alum in an aqueous suspension of a previously precipitated, hydrated silica, hydrated alumina may be precipitated and coated on the suspended hydrated silica to form a composite gelatinous material, from which undesirable alkali metal and other water-soluble salts may be readily removed by washing and filtering without undue complication.

Regardless of the method employed for the preparation of the high alumina, silica-alumina catalyst material, the essential fact is that the material be a substantially fully hydrated gel or hydrogel, as opposed to being a xerogel or dried gel.

Preferably, the silica-alumina hydrogel is prepared so that the pore volume of the final catalyst when spray dried is within the range of between about .3 and about .7 in that it has been our experience that hydrogels which when spray dried have small pore volumes, are softer and more easily broken down so as to obtain a good degree of intimate association with the additive, as for example, by homogenization, a preferred technique whereby intimate association is obtained in accordance with this invention. In this connection it will be noted that the smaller the pore volume of the hydrogel component when spray dried, the smaller the pore volume of the spray dried catalyst product of this invention. In general, lower strike temperatures, solids, pH etc., as known by those skilled in the art, may be employed to prepare such hydrogels. Control of physical structure of catalyst is described in "Control of Physical Structure of Silica-Alumina Catalyst," by K. D. Ashley and W. B. Innes, Industrial and Engineering Chemistry, vol. 44, page 2857, December 1952.

The inorganic dry additive material which is added to the hydrogel may either be a material which is relatively inert with respect to catalytic activity compared to the silica-alumina portion of the final catalyst product or wholly inert with respect to such activity. The additive material may be finely divided inorganic materials having a siliceous base, such as silica flour, certain clays, such as natural or uncalcined kaolin clay, fuller's earth, or the like. Preferably, these additives are alkali metal free. With respect to these illustrative additive materials, it will be noted that the silica flour is a substantially inert additive material, while the kaolin and fuller's earth are possessed of some activity, catalytically speaking.

The additive material is added to the high alumina, silica-alumina hydrogel in amounts such as to constitute from between 10 and about 60% by weight of the final catalyst product and preferably from between about 30 and about 50% by weight thereof for optimum balanced performance.

The additive may be added to a filtered, washed and reslurried silica-alumina hydrogel. Additionally, it may be added to a homogenized hydrogel, the mixture being subsequently intimately associated as by a second homogenizing step. Thus, in general, the addition of the additive to the hydrogel may occur anywhere in the process, so long as the additive and hydrogel are in intimate association at the time of spray drying.

It is an essential element of this invention that the additive material and the silica-alumina hydrogel be in intimate association one with the other for a suitable microspheroidal fluid catalyst product to result.

In order to obtain satisfactory intimate association, the weight ratio of hydrogel fines to additive fines must be at least .8 and preferably .9–2 to 1, for compositions of this invention containing from 10 to about 60% by weight of additive. It will thus be seen that for a composition containing 50% by weight of additive that at least 90% of the hydrogel employed must be hydrogel fines as that term is employed herein. Weight ratios higher than 2 to 1 may be employed, however, no particular advantage results and the homogenizing or other procedure whereby higher percentages of hydrogel fines are achieved unnecessarily tie up equipment, increasing costs.

It has been determined that adequate intimate association may be obtained by comminuting the mixture of additive and hydrogel by passing it through a homogenizer such as an ordinary spring-loaded homogenizing valve, or by homogenizing the hydrogel and then intimately associating it with the additive. In this connection, it has been determined that the degree of association necessary for this invention and that which results in a hydrogel to additive fines ratio of at least .8 may be defined as the amount resulting from or achieved by homogenizing the silica-alumina hydrogel and additive composition through a springloaded homogenizing valve at a defined pressure drop value of between 300 to about 3000 lbs. per square inch and preferably a value of from between about 1000 and 3000 lbs. per square inch. It should be noted that homogenization as a means of controlling component particle sizes and of obtaining the desired degree of intimate association thereby is purely illustrattive, and any means of accomplishing the same effect which would correspond to that obtained by the proposed illustrative method is considered to be fully contemplated by this invention.

The degree of homogenization within the above-defined pressure drop limits or equivalent means of obtaining intimate association required can be determined by wet screening of the hydrogel component and any method of homogenizing or comminuting that will result in the hydrogel containing sufficient hydrogel fines so that the weight ratio of hydrogel fines to additives is at least .8 is satisfactory.

In addition to employing a homogenizer, homogenization may also be effected by employing substantial nozzle pressure during spray drying. Where nozzle pressures are employed in spray drying after employment of a conventional homogenizer, the pressure drop across a valve in p.s.i. and the nozzle pressure in p.s.i. are additives and the total may be considered as the degree of homogenization that would be achieved by employing either the homogenizing valve or nozzle pressure alone.

After the additive material and the silica-alumina hydrogel have been intimately associated, they are dried by spraying the composition through a nozzle or off of a spray wheel into contact with hot gases. Such drying may be accomplished by any suitable spray drier. One that has been employed with success is described in U.S. Patent No. 2,644,516, dated July 7, 1953. Although gas inlet temperatures up to 1300° F. may be employed, the temperature of the drying gas entering the spray-drying chamber is preferably controlled within the range of about 400 to 1000° F. so that the silica-alumina hydrogel in intimate association with the extender material will be converted into set, partially dehydrated microspheroidal gel particles. Spray drying usually results in a moisture content of from between about 7 and 15% in the spray-dried product.

The catalyst of this invention is employed as other commercial silica-alumina cracking catalysts in fluid bed conversion processes in which a high boiling petroleum hydrocarbon is catalytically cracked to produce high octane gasoline in its presence. In such a process, as is well known to those skilled in the art, the catalyst particles are in a state of suspension in a vaporous stream of hydrocarbon and the cracking is effected or carried out at a temperature in the range of between 700° F. and 1100° F. and preferably between 900° F. and 1000° F.

In the present specification, the micron size referred to therein is determined by employing a micromesh sieve, the openings of which are 44 microns in size. In the procedure employing the sieve, two identical samples of hydrogel are weighed out. One of the weighed samples of hydrogel is transferred to the sieve over a Büchner funnel. Water is then added and a vacuum applied. A soft brush (camel hair) is employed to prevent the formation of a filter cake, every precaution being employed to prevent breaking down the hydrogel particles. When microscopic examination indicates there are no fines on the sieve, the material on the sieve is dried and weighed. The second sample of hydrogel is dried and weighed. The weight percent of hydrogel fines coarser than 44 microns is then determined. This percent from one hundred equals the weight percent of hydrogel fines as that term is defined herein.

In order that the present invention may be more fully understood, the following examples are given primarily by way of illustration. All parts and percentages referred to therein are by weight unless otherwise specifically designated.

EXAMPLE 1

A high alumina, silica-alumina hydrogel filter cake (25% alumina based on dry weight) prepared in accordance with U.S. Patent No. 2,701,793, containing 10% solids, is diluted with water to give a slurry containing 7.5% solids.

Slowly, a quantity of silica flour, having about 97.5% of its particles finer than 44 microns, is added in an amount equal to the solids present in the slurry. Agitation is employed during the addition. Sufficient water is then added so that the total solids content, that is, the silica-alumina hydrogel and the silica flour, equals 12.5%.

This slurry is continuously mixed for an additional 15-minute time period and passed through a homogenizing valve at a pressure drop across the valve of 1000 p.s.i. and spray dried, employing an inlet temperature of 650° F. and a nozzle pressure of 700–1000 p.s.i. This degree of homogenization was sufficient to insure that as the mixture goes to the spray drier, at least 80% by weight of the hydrogel particles are finer than 44 microns. The ratio of hydrogel fines to finely divided additive material is .85. The pore volume of the final catalyst is .45 cc./gm.

The final product was a microspheroidal catalyst material containing 50% of silica flour and 50% of silica-alumina catalyst in intimate association.

EXAMPLE 2

The procedure employed in Example 1 is followed, except that the quantity of silica flour added is such that the final catalyst contains 30% silica flour and 70% of silica-alumina catalyst in intimate association. The percent of hydrogel by weight finer than 44 microns is at least 80% and the percent additive by weight finer than 44 microns is 97.5%.

The final catalyst had a pore volume of .72 cc./gm. and a hydrogel fine to finely divided additive ratio of about 1.9.

While the higher spray drying temperatures may be employed in order to shorten production times, it is preferred that the intimately associated additive and silica-alumina catalyst material in accordance with this invention be spray dried by employing inlet temperatures on the order of between 500 and 800° F., it being noted that the employment of higher inlet temperatures as, for example, 1200° F., may result in the fracturing of the individual particles with the undesirable production of fines.

In order to compare the improved extended catalyst of this invention with commercial silica-alumina cracking catalyst, Table I is set forth hereinbelow.

*Table I*

|  | Ex. 1 | Ex. 2 | Cat. A | Cat. B [1] |
|---|---|---|---|---|
| Activity: |  |  |  |  |
| F | 67 | 74 | 110 | 120 |
| S | 17 | 21 | 22 | 29 |
| C | 50 |  |  | 73 |
| Gas Factor: |  |  |  |  |
| F | 1.2 | 1.2 | 1.1 | 1.2 |
| S | 1.2 | 1.1 | 1.1 | 1.2 |
| C | 1.6 |  |  | 1.8 |
| Carbon Factor: |  |  |  |  |
| F | 1.4 | 1.5 | 1.2 | 1.4 |
| S | 1.4 | 1.3 | 1.2 | 1.4 |
| C | 2.4 |  |  | 2.6 |
| Percent Carbon on Fresh Catalyst | 8 | 9 | 14 | 18 |
| Apparent Bulk Density, g./cc.: |  |  |  |  |
| F | .52 | .44 | .47 | .47 |
| S | .57 | .50 | .57 | .59 |
| Pore Volume, cc./g | .46 | .72 | .70 | .70 |
| Surface Area, m.²/g | 260 | 350 | 570 | 496 |

[1] Same hydrogel as used for Examples 1 and 2.
F = Fresh calcined for 1 hour at 1,100° F.
S = Steamed 17 hours at 750° C. Accelerated test to determine stability. Data recorded under "S" measured after one hour of an operation in a cracking unit according to the "American Cynamid Manual of Test Methods for Synthetic Fluid Cracking Catalysts," 1957.
C = After contamination with 0.1% Ni.
Catalyst A = 13% alumina, silica-alumina catalyst.
Catalyst B = 25% alumina, silica-alumina catalyst.

Gas factors, carbon factors, apparent bulk density, pore volume and surface area were determined in accordance with the above-identified Cyanamid publication.

Table I hereinabove illustrates that the steamed catalysts produced in accordance with this invention containing 50% additive approach the steamed activity of commercially available 13% alumina, silica-alumina catalyst.

More significantly, Table I further illustrates that catalysts prepared in accordance with this invention have substantially lower amounts of carbon on the fresh catalysts. The presence of relatively large amounts of carbon on the conventionally prepared alumina catalyst results in its rapid deactivation (less stable activity) due to faster burning and greater total heat evolution during regeneration. In this connection, it should be noted that rapid deactivation in present commercial catalysts due to regeneration occurs to a substantial extent because of the inability of generated heat to dissipate. In the catalyst of this invention, this disadvantage is at least in part overcome, in that the additive component, which is either inactive or relatively inactive, takes up substantial amounts of heat, and thus the active component is not as readily deactivated.

A further surprising result indicated in Table I hereinabove is that even though the catalysts illustrated in Examples 1 and 2 contain 50% and 30% additive respectively, the initial and steamed activity is substantially in excess of 50% and 30% of that of the high alumina, silica-alumina catalyst material (catalyst B).

In addition to a microspheroidal fluid catalyst having good activity, carbon and gas factors, it is essential that it have good attrition resistance. While some attrition is permissible or even desirable, a catalyst that attrites excessively is commercially unacceptable.

In order to demonstrate the meritorious attrition resistance of catalysts of this invention compared with catalysts prepared by seemingly closely related processes, the following experiments were carried out.

EXAMPLE 3

A high alumina (25% by weight of alumina) silica-alumina hydrogel is prepared according to the procedure of U.S. Patent 2,701,193. The hydrogel is filtered and washed three times. The hydrogel contains 25% based on its dry weight of alumina and the balance silica. To an aqueous slurry of the third stage filter cake there are added fines from a cracking catalyst disposal pond. 91% by weight of the fines are finer than 44 microns. The amount of fines added are sufficient to constitute 50% by weight of the final catalyst dried.

The resulting composition is intimately mixed, homogenized as in Example 1 and passed to a spray drier. The additive particles as fed to the spray drier are characterized by 9% by weight of the particles being finer than 44 microns. The hydrogel particles as fed to the spray drier are characterized by about 80% of the particles being finer than 44 microns. The weight ratio of hydrogel fines to finely divided additive material is 1.

EXAMPLE 4

A high alumina (25% by weight of alumina) silica-alumina hydrogel is prepared in accordance with the procedure of U.S. Patent 2,701,193. The hydrogel is filtered and washed three times. To an aqueous slurry of the third stage filter cake there is added finely divided kaolin in an amount sufficient to constitute 45% by weight of the final dried catalyst.

The high alumina, silica-alumina hydrogel and kaolin are intimately mixed and then fed to a spray drier without homogenization, and dried under normal conditions.

The hydrogel particles as fed to the spray drier are characterized by 55% of the particles being finer than 44 microns.

The kaolin particles as fed to the spray drier are characterized by about 99% of its particles being finer than 44 microns.

The weight ratio of hydrogel fines to finely divided additive is about .5.

EXAMPLE 5

The same procedure as is employed in Example 4 is employed here, except kaolin in an amount equal to 55% of the final dried catalyst is introduced into the high alumina, silica-alumina hydrogel.

The mixture is intimately mixed and then fed to the spray drier without homogenization and dried under normal conditions.

The particle size distribution of the kaolin is such that about 99% of the particles are finer than 44 microns as fed to the spray drier.

47% of the particles of the high alumina, silica-alumina hydrogel as fed to the spray drier are finer than 44 microns.

The weight ratio of hydrogel fines to additive fines is about .4.

EXAMPLE 6

A high alumina, silica-alumina gel is prepared and the hydrogel is filtered and washed three times. The hydrogel contained, on a dry basis, 25% by weight of alumina and the balance silica. To an aqueous slurry of third stage filter cake, kaolin is added in an amount equal to 50% by weight of the final dried catalyst.

The resulting mixture is then homogenized.

The hydrogel as fed to the spray drier is characterized by 98% of its particles being finer than 44 microns.

The kaolin as fed to the spray drier was characterized by 99% of the particles being finer than 44 microns.

The weight ratio of hydrogel fines to finely divided additive is about 1.

EXAMPLE 7

200 pounds of 22% alumina, silica-alumina hydrogel (8.03% solids) is charged to a mixing kettle and 18 pounds of finely divided kaolin (92.9% solids) is slowly added to the silica-alumina hydrogel slurry. This mixture is then agitated enough to achieve good mixing, and 162 pounds of water is added thereto.

A batch of this material so prepared is forced through a homogenizing valve at a homogenizing pressure of 300 p.s.i. and fed to a spray drier at a feed rate of between 2 and 2½ pounds slurry per minute to a 3½" diameter spray wheel rotating at 10,000 r.p.m. The gas inlet temperature is 600° F. and the outlet temperature is 450° F.

The final catalyst contained 50% by weight of kaolin. 68% of the hydrogel was finer than 44 microns as fed to the spray drier, and 99% of the kaolin was finer than 44 microns. The weight ratio of hydrogel fines to additive is about .7.

The catalysts prepared in Examples 1–7 above were evaluated for attrition resistance in accordance with the process described in U.S. Patent 2,768,125.

According to this method, the percent of attrition resistance reported is obtained by placing a known amount of catalyst material of predetermined weight (a 50 gram sample) in a hollow cylinder supported on a disk with three .015" diameter holes; a stream of air is then turned on so that 15 cubic feet per hour of air passes through the holes, producing high velocity air jets which effect attrition similar to commercial fluid cracking catalyst converter units. At the end of a 45 hour period the flask-filter collection system containing elutriated fines under 15 microns is removed and weighed. The weight elutriated fines are then used to calculate the percent overhead as a percent of the initial catalyst sample charged to the test unit. The lower the percent of overhead, the higher the attrition resistance.

The results of these tests are set forth in Table II below.

Table II

| Catalyst | Percent Additive | Percent Hydrogel finer than 44 microns | Percent Additive finer than 44 microns | Hydrogel fines/Additive ratio | Percent Overhead |
| --- | --- | --- | --- | --- | --- |
| Example 1 | 50 | 80 | 97.5 | .85 | 21 |
| Example 2 | 30 | 80 | 97.5 | 1.9 | 28 |
| Example 3 | 50 | 80 | ¹ 91 | 1 | 50 |
| Example 4 | 45 | 55 | 99 | .5 | 64 |
| Example 5 | 55 | 47 | 99 | .4 | 70 |
| Example 6 | 50 | 98 | 99 | 1 | 17 |
| Example 7 | 50 | 68 | 99 | .7 | 65 |
| C | | | | | 33 |

¹ Percent additive finer than 44 microns too low.
C—Commercially available spray dried "clay" catalyst.

It will be apparent from Table II above that only the additive containing catalyst prepared in accordance with this invention may be characterized as good attrition resistant catalyst.

Further, Table II demonstrates that catalysts of this invention compare very favorably with a commercial spray dried microspheroidal catalyst prepared from "clay."

A further unexpected feature of this invention is that nickel contaminated or poisoned catalysts of this invention in general have carbon and gas factors significantly lower than commercial 25% alumina, silica-alumina cracking catalysts. In view of the fact that the catalyst of this invention, on a weight basis, contains one-half the number of active sites of a 25% alumina catalyst, it might be expected that the carbon factor would be twice that of the high alumina.

As an alternative to the present process, it may be proposed to either so modify commercial low alumina, silica-alumina catalysts, as for example, of the type containing about 13% alumina, or to simply employ such catalysts in lieu of the modified catalysts contemplated by this invention. With respect to the first procedure, it will become apparent that such modification of a low alumina catalyst to any significant degree would result in relatively poor activity for such a catalyst in that the amount of alumina and thus the catalytic sites contained therein may be reduced readily beyond an acceptable limit. Further, a particular and important advantage of this invention would be lost. This advantage is that by the present modification of a high alumina, silica-alumina fluid cracking catalyst material, a final catalyst product having an acceptably high number of catalytically active sites is readily and inexpensively produced.

As has been pointed out, the catalyst of this invention is less costly to manufacture than comparable low alumina, silica-alumina catalysts for numerous apparent reasons. Thus, it should be noted that in the preparation of a high alumina, silica-alumina hydrogel it is not necessary to employ as stringent washing of the hydrogel to achieve a given alkali metal and sulfate content, based on the finished catalyst product.

While the present invention has been described primarily in conjunction with silica-alumina catalysts of the high alumina type, that is, containing about 25% by weight of alumina, it should be noted that small amounts of other catalytic reactive materials, as for example, titania, magnesia, boria and the like, may be present in the catalyst composition of this invention for particular applications and uses.

This application is a continuation-in-part of our application Serial No. 719,471, filed March 6, 1958, which is now abandoned.

We claim:

1. A process for producing a microspheroidal fluid cracking catalyst comprising intimately associating an undried substantially fully hydrated silica-alumina gel containing fines of said hydrated gel, said fines consisting of particles finer than 44 microns and containing about 20 to about 30% of alumina, based on the dry weight of the gel, with from 10 to 60%, based on the weight of total ignited solids of the final catalyst product, of a finely divided additive material, 95% by weight of the particles of which are finer than 44 microns, and a major portion of the particles of which are finer than 10 microns, the weight ratio between the hydrated gel fines and the additive being at least .8, and spray drying said intimately associated composition.

2. A process for producing a microspheroidal fluid cracking catalyst comprising intimately associating by homogenizing through a homogenizing valve at a pressure drop of between 1000 and 3000 p.s.i. an undried substantially fully hydrated silica-alumina gel containing fines of said hydrated gel, said fines consisting of particles finer than 44 microns and containing about 20 to about 30% of alumina, based on the dry weight of the gel, with from 10 to 60%, based on the weight of total ignited solids of the final catalyst product, of a finely divided additive material, 95% by weight of the particles of which are finer than 44 microns, and a major portion of the particles of which are finer than 10 microns, the weight ratio between the hydrated gel fines and the additive being at least .8, and spray drying said intimately associated composition.

3. A process for producing a microspheroidal fluid cracking catalyst comprising intimately associating an undried substantially fully hydrated silica-alumina gel containing fines of said hydrated gel, said fines consisting of particles finer than 44 microns and containing about 20 to about 30% of alumina, based on the dry weight of the gel, with from 10 to 60%, based on the weight of total ignited solids of the final catalyst product, of finely divided silica flour, 95% by weight of the particles of which are finer than 44 microns, and a major portion of the particles of which are finer than 10 microns, the weight ratio between the hydrated gel fines and the silica flour being at least .8, and spray drying said intimately associated composition.

4. A process for producing a microspheroidal fluid cracking catalyst comprising intimately associating an undried substantially fully hydrated silica-alumina gel containing fines of said hydrated gel, said fines consisting of particles finer than 44 microns and containing about 20 to about 30% of alumina, based on the dry weight of the gel, with from 10 to 60%, based on the weight of total ignited solids of the final catalyst product, of finely divided kaolin, 95% by weight of the particles of which are finer than 44 microns, and a major portion of the particles of which are finer than 10 microns, the weight ratio between the hydrated gel fines and the kaolin being at least .8, and spray drying said intimately associated composition.

5. A process for producing a microspheroidal fluid cracking catalyst comprising intimately associating an undried substantially fully hydrated silica-alumina gel containing fines of said hydrated gel, said fines consisting of particles finer than 44 microns and containing about 20 to about 30% of alumina, based on the dry weight of the gel, with from 10 to 60%, based on the weight of total ignited solids of the final catalyst product, of finely divided fuller's earth, 95% by weight of the particles of which are finer than 44 microns, and a major portion of the particles of which are finer than 10 microns, the weight ratio between the hydrated gel fines and the fuller's earth being at least .8, and spray drying said intimately associated composition.

6. A process for producing a microspheroidal fluid cracking catalyst comprising intimately associating by homogenizing through a homogenizing valve at a pressure drop of between 1000 and 3000 p.s.i. an undried substantially fully hydrated silica-alumina gel containing fines of said hydrated gel, said fines consisting of particles finer than 44 microns and containing about 20 to about 30% of alumina, based on the dry weight of the gel, with from about 30 to 50%, based on the weight of total ignited solids of the final catalyst product, of a finely divided dried siliceous inorganic additive material, 95% by weight of the particles of which are finer than 44 microns, and a major portion of the particles of which are finer than 10 microns, the weight ratio between the hydrated gel fines and additive being at least .8, and thereafter spray drying the homogenized material employing an inlet temperature of between 500 and 800° F.

7. A fluid microspheroidal cracking catalyst characterized by a low percent of carbon thereon after use and before regeneration prepared by intimately associating an undried substantially fully hydrated silica-alumina gel containing fines of said hydrated gel, said fines consisting of particles finer than 44 microns and containing about 20 to about 30% of alumina, with from 10 to 60%, based on the weight of total ignited solids of the final catalyst product, of a finely divided inorganic additive material, 95% by weight of the particles of which are finer than 44 microns, and a major portion of the particles of which are finer than 10 microns, the weight ratio between the hydrated gel fines and additive being at least .8, and thereafter spray drying said intimately associated composition.

8. A fluid microspheroidal cracking catalyst characterized by a low percent of carbon thereon after use and before regeneration prepared by intimately associating an undried substantially fully hydrated silica-alumina gel containing fines of said hydrated gel, said fines consisting of particles finer than 44 microns and containing about 20 to about 30% of alumina, with from 30 to 50%, based on the weight of total ignited solids of the final catalyst product, of a finely divided inorganic additive material, 95% by weight of the particles of which are finer than 44 microns, and a major portion of the particles of which are finer than 10 microns, the weight ratio between the hydrated gel fines and the additive being at least .8, and thereafter spray drying said intimately associated composition.

References Cited in the file of this patent
UNITED STATES PATENTS

| | | |
|---|---|---|
| 2,428,257 | Ahlberg et al. | Sept. 30, 1947 |
| 2,844,523 | Veltman et al. | July 22, 1958 |
| 2,921,034 | Houdry | Jan. 12, 1960 |